United States Patent

Sato

[11] Patent Number: 5,860,035
[45] Date of Patent: Jan. 12, 1999

[54] IMAGE RECORDING AND REPRODUCING DEVICE

[75] Inventor: Koichi Sato, Tokyo, Japan

[73] Assignee: Asahi Kogaku Kogyo Kabushiki Kaisha, Tokyo, Japan

[21] Appl. No.: 857,176

[22] Filed: May 15, 1997

[30] Foreign Application Priority Data

May 16, 1996 [JP] Japan ................................ 8-146654
Nov. 13, 1996 [JP] Japan ................................ 8-317089

[51] Int. Cl.⁶ .......................................... G03B 17/48
[52] U.S. Cl. ............................. 396/429; 396/30
[58] Field of Search .................... 396/429, 430, 396/30

[56] References Cited

U.S. PATENT DOCUMENTS

| | | | |
|---|---|---|---|
| 5,424,156 | 6/1995 | Aoki et al. | |
| 5,526,048 | 6/1996 | Yamamoto | |
| 5,631,700 | 5/1997 | Sato | 348/222 |
| 5,655,170 | 8/1997 | Yamamoto et al. | 396/429 |
| 5,678,101 | 10/1997 | Mogamiya et al. | 396/429 |
| 5,708,472 | 1/1998 | Morisawa et al. | 348/207 |
| 5,739,849 | 4/1998 | Aoki et al. | 396/429 |
| 5,778,260 | 7/1998 | Sato et al. | 396/30 |
| 5,778,270 | 7/1998 | Morisawa | 396/429 |

FOREIGN PATENT DOCUMENTS 52280  5/1993  Japan .

*Primary Examiner*—Russell E. Adams
*Attorney, Agent, or Firm*—Greenblum & Bernstein, P.L.C.

[57] ABSTRACT

An image recording and reproducing devices are mounted in a camera using an electro-developing recording medium by which an image is electronically developed. A color image and a monochromatic image can be recorded in the electro-developing recording medium. When recording the color image, red, green, and blue images are recorded in three image recording areas. A recognition area and a positioning mark recording area are formed adjacent to each of the image recording areas. A recognition mark indicating that the image recorded in the corresponding image recording area is red, green, or blue, is recorded in the recognition area. The positioning mark is recorded in the positioning mark recording area to indicate the relative position of each of the red, green, and blue images.

16 Claims, 17 Drawing Sheets

□+□ ...... POSITIONING MARK

□ ...... TRANSPARENT

IMAGE RECORDING AND REPRODUCING DEVICE

BACKGROUND OF THE INVENTION

1. Field of the Invention

The present invention relates to an image recording device and an image reproducing device using a recording medium by which an image formed through a photographing optical system is electronically developed.

2. Description of the Related Art

Conventionally, as disclosed in Japanese Unexamined Patent Publication No. 5-2280 and U.S. Pat. No. 5,424,156, there is known a photographic material which is directly and electronically developed so that the developed visible image can be immediately obtained. In this specification, such a recording medium is referred to as an electro-developing recording medium, and an electronic still camera using the electro-developing recording medium is referred to as an electro-developing type camera.

The electro-developing recording medium can be provided with three image recording areas in which red, green, and blue images, which are obtained by color-separating an object image, can be recorded, so that an integrated color image can finally be obtained. A monochromatic image can also be recorded in the electro-developing recording medium and, in this case, three separate monochromatic images can be recorded in the recording areas.

When an image recorded in the electro-developing recording medium is reproduced, the reproduction process differs depending upon whether the image is color or monochromatic. Therefore, it is necessary, prior to the reproduction process, to determine whether the appearance of the image within the electro-developing recording medium is color or monochromatic.

SUMMARY OF THE INVENTION

Therefore, an object of the present invention is to provide a device by which the determination based on the appearance of the image, within the electro-developing recording medium, is not required before the reproduction process.

According to the present invention, there is provided a recording device comprising an electro-developing recording medium by which an image formed thereon is electronically developed, an image recording processor, and a recognition mark recording processor.

The electro-developing recording medium has a plurality of image recording areas in which an image can be recorded, respectively. The image recording processor records selectively one of a monochrome image and a color image in the image recording areas. The recognition mark recording processor records a recognition mark in a recognition area corresponding to each of the image recording areas. The recognition mark indicates whether an image recorded in each of the image recording areas is monochromatic or color.

Further, according to the present invention, there is provided a device for recording an image in an image recording area of an electro-developing recording medium by which an image formed in the image recording area is electronically developed and recorded, the recording device comprising a recognition mark recording processor. The recognition mark recording processor records a recognition mark in a recognition area corresponding to the image recording area when an image is recorded in the image recording area. The recognition mark indicates whether the image recorded in the image recording area is monochromatic or color.

Furthermore, according to the present invention, there is provided a device for reproducing an image recorded in an image recording area of an electro-developing recording medium by which an image formed in the image recording area is electronically developed and recorded, the reproducing device comprising an image reproducing processor. The image reproducing processor reproduces the image recorded in the image recording area based on a recognition mark indicating whether the image recorded in the image recording area is monochromatic or color.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
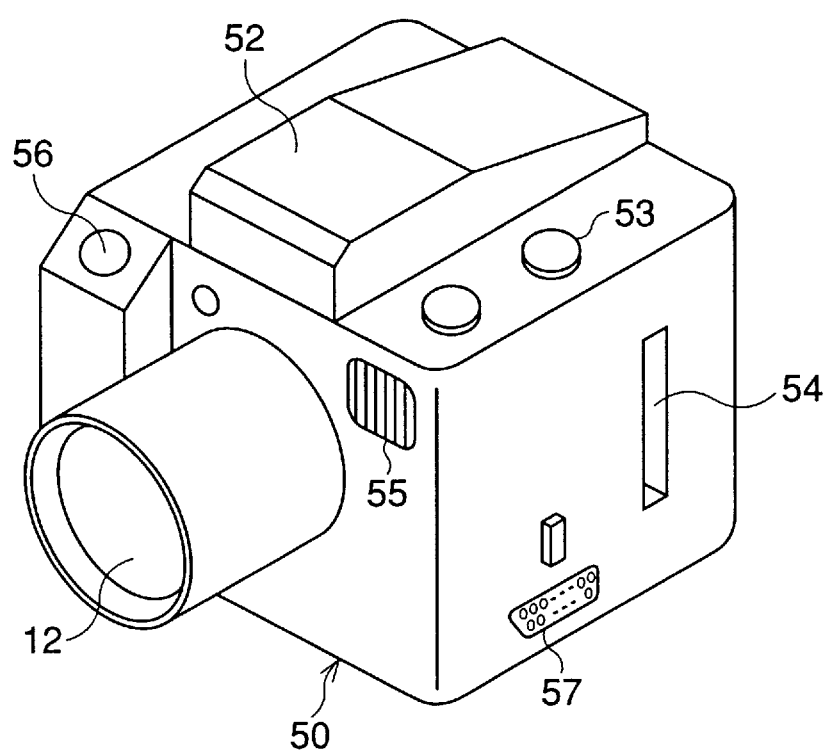
FIG. 1 is an external view showing an electro-developing type camera to which an embodiment of the present invention is applied.

FIG. 1 is an external view of an electro-developing type camera to which an embodiment according to the present invention is applied.

When viewing a camera body 50 from the front side, a photographing optical system 12, including a photographing lens system and so on, is provided approximately at the center portion of the front surface of the camera body 50, and an electronic flash 55 is disposed thereon to the right of and above the photographing optical system 12. A release button 56 is provided on the side opposite to the electronic flash 55.

On the upper surface of the camera body 50, a view-finder 52 is provided at the center portion thereof and is extended from the front to the rear end of the camera body 50. A scan start switch 53 is provided beside the view-finder 52. The scan start switch 53 is provided for starting a reading operation in which an image recorded on an electro-developing recording medium (not shown) is read.

A communication connector 57 is provided on a lower portion of a side surface of the camera body 50, so that an image signal obtained by this camera can be outputted to an external recording device (not shown). Further, a slot 54, into which the electro-developing recording medium is inserted in the camera body 50, is formed in the side surface of the camera body 50.

Figure 2:
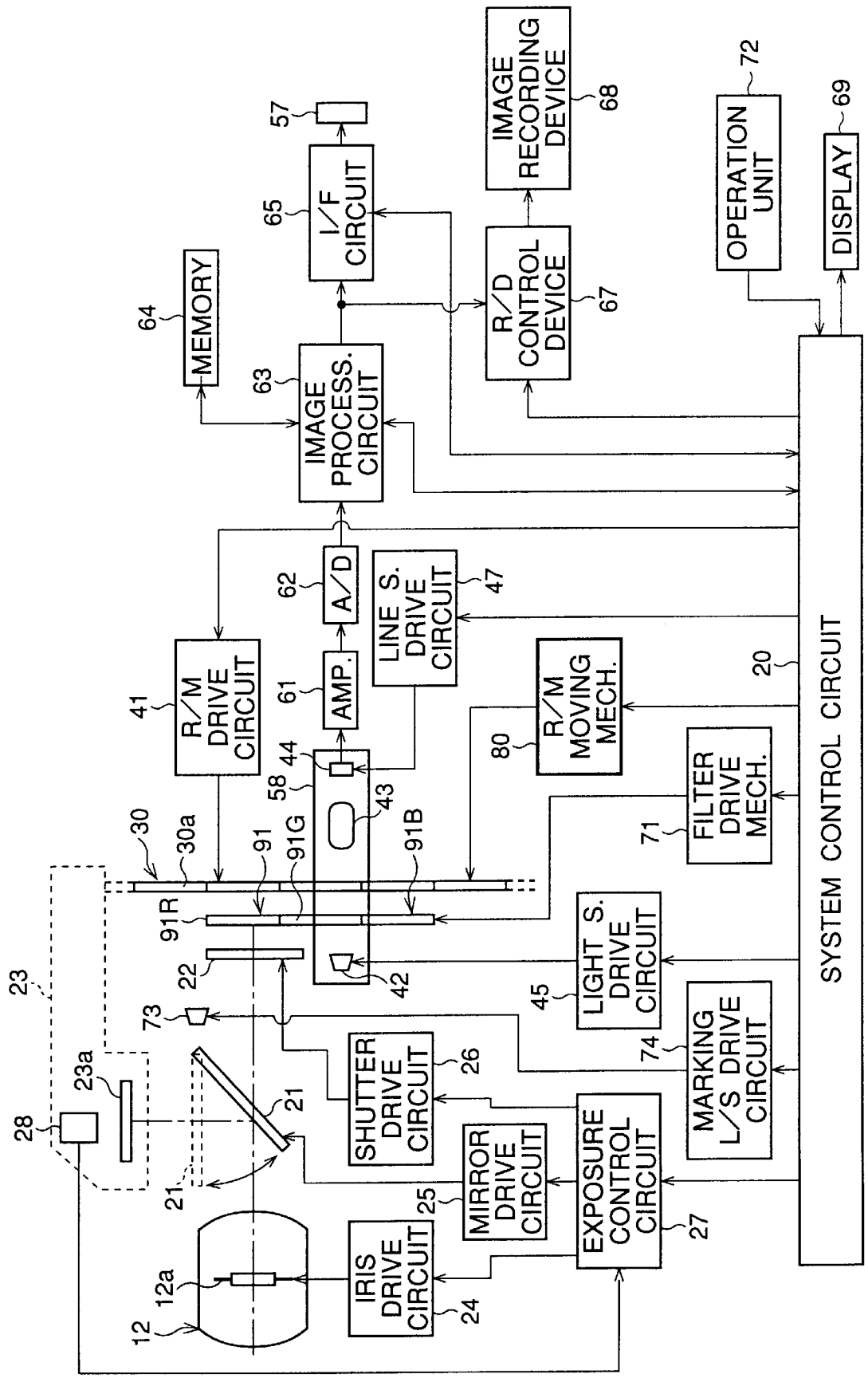
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12. A color filter (i.e., dichroic filter) 91 is provided in front of the electro-developing recording medium 30. A quick return mirror 21 is placed between the photographing optical system 12 and the color filter 91. A shutter 22 is provided between the quick return mirror 21 and the color filter 91. A focusing glass 23a included in a view-finder optical system 23 is disposed above the quick return mirror 21. A photometry sensor 28 is disposed in the view-finder optical system 23 to sense the amount of light beam led from the photographing optical system 12.

The electro-developing recording medium 30 has a plurality of image recording areas 30a, and each area corresponds to the size of one frame of an object image. The color filter 91 has an R (red) filter element 91R, a G (green) filter element 91G, and a B (blue) filter element 91B, each having the same size as the image recording areas 30a, respectively, i.e., corresponding to one frame of an object image. Note that, in FIG. 2, the electro-developing recording medium 30 and the color filter 91 are extended in a vertical direction, respectively. In reality, however, the electro-developing recording medium 30 and the color filter 91 are extended in a horizontal direction, respectively, and the longitudinal directions of the electro-developing recording medium 30 and the color filter 91 may be coincident with the vertical direction or the horizontal direction of the camera body 50.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under control of the exposure control circuit 27 based on an output signal from the photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, thus forming a two-dimensional image thereon.

An electric voltage is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A support member 58, which is fixed to a fixed frame (not shown), is provided close to the shutter 22. A main light source 42, a scanner optical system 43, and a line sensor 44 are supported by the support member 58. The main light source 42 has a plurality of LEDs (photodiodes). The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The scanner optical system 43 is disposed between the light source 42 and the line sensor 44. The light source 42, the scanner optical system 43, and the line sensor 44 are arranged along the optical axis of the light source 42, which is parallel to the optical axis of the photographing optical system 12.

The color filter 91 and the electro-developing recording medium 30 can be moved in a direction perpendicular to the optical axis of the photographing optical system 12. The color filter 91 and the electro-developing recording medium 30 are moved by a filter drive mechanism 71 and a recording medium moving mechanism 80, respectively, in the longitudinal directions thereof.

In a photographing operation of a color image, the color filter 91 and the electro-developing recording medium 30 are moved as one, so that either the centers of the R filter element 91R and the first recording area 30a, or the centers of the G filter element 91G and the second recording area 30a, or the centers of the B filter element 91B and the third recording area 30a are positioned on the optical axis of the photographing optical system 12. Namely, R-images, G-images, and B-images are recorded in the first, second, and third recording areas 30a, respectively.

Conversely, in a photographing operation of a monochromatic image, the color filter 91 is positioned to offset from the optical axis of the photographing optical system 12, and the center of a predetermined image recording area 30a is positioned at the optical axis of the photographing optical system 12.

When an image recorded on the electro-developing recording medium 30 is read, the color filter 91 is retreated to a fixed position, which is out of the range of the optical axis of the light source 42, i.e., to the side of the shutter 22, for example. In this state, each of the recording areas 30a is moved between the light source 42 and the scanner optical system 43 in a direction perpendicular to the optical axis of the scanner optical system 43. Namely, the image recorded on the electro-developing recording medium 30 is illuminated by the light source 42 and formed on the light receiving surface of the line sensor 44, through an operation of the scanner optical system 43.

ON and OFF control of the light source 42 is performed by a light source drive circuit 45. Control of the reading operation of pixel signals generated in the line sensor 44 is carried out by a line sensor drive circuit 47. The circuits 45 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth of pixel signals.

The pixel signals read from the memory 64 are inputted to an interface circuit 65 through the image processing circuit 63, so that the pixel signals are subjected to a predetermined process such as a format conversion, and can then be outputted to an external computer (not shown) through the communication connector 57. The pixel signals outputted from the image process circuit 63 are subjected to a predetermined process such as an image compression and a format conversion in a recording device control circuit 67, so that the pixel signals can be recorded on a recording medium such as an IC memory card, for example, in an image recording device 68. The interface circuit 65 and the image recording device 68 are operated in accordance with a command signal outputted from the system control circuit 20.

An operation unit 72, including the release button 56, a photographing mode selection switch, and so on is connected to the system control circuit 20. The photographing operation and the reading operation are performed by operating the operation unit 72. For example, when the release button 56 is partly depressed, a photometry switch (not shown) is turned ON so that a photometry by the photometry sensor 28 is started, and when the release button 56 is fully depressed, a release switch (not shown) is turned ON, and thus, the photographing operation is performed.

A display device 69 is connected to the system control circuit 20 to indicate various setting conditions of the electro-developing type camera.

When the photographing operation is performed, recognition marks and a positioning mark are formed in portions adjacent to the three image recording areas 30a. The recognition marks are used for recognizing whether the images recorded in the recording areas 30a are color or monochromatic. The positioning mark implies the relative positions of each of the R-images, G-images, and B-images which are read from the electro-developing recording medium 30. Thus, when these R-images, G-images, and B-images are superimposed on each other, so that a single natural color image is reproduced on a computer display monitor, the positioning mark is used for adjusting the relative position of each of the R-images, G-images, and B-images, with respect to each other.

For forming the recognition marks and the positioning mark, a marking light source 73 is provided at a portion close to a surface of the shutter 22, the surface facing the photographing optical system 12. ON and OFF control of the marking light source 73 is performed by a marking light source drive circuit 74, which is operated based on a command signal outputted by the system control circuit 20.

Figure 3:
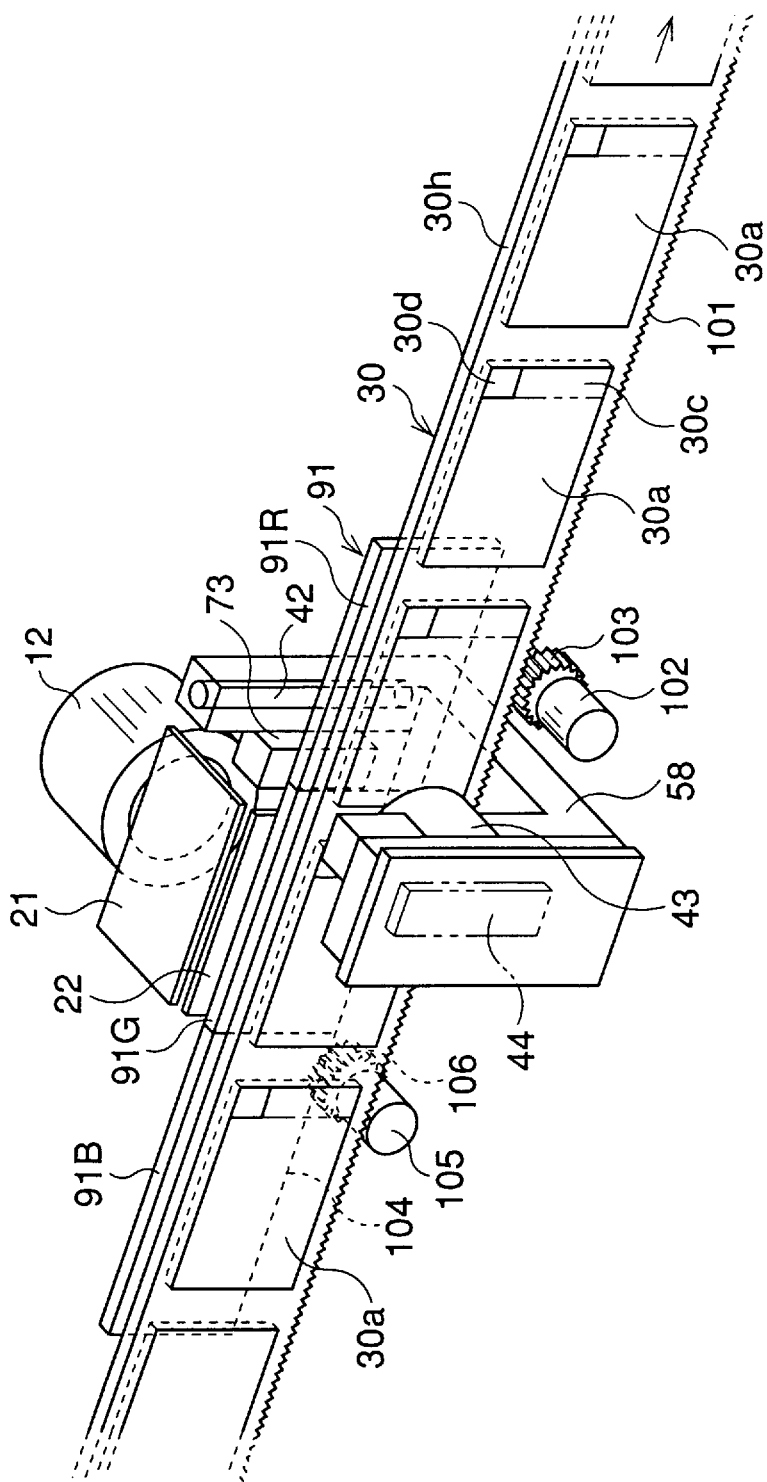
FIG. 3 is a perspective view showing a construction for moving an electro-developing recording medium.

FIG. 3 shows a construction for moving the electro-developing recording medium 30.

The electro-developing recording medium 30 is extended like a strip, and has a plurality of image recording areas 30a which are held by a recording medium holder 30h. The recording medium holder 30h may be constructed in such a manner that the holder 30h has elasticity and the both ends of the holder 30h are wound around winding shafts or alternatively, may be constructed from a glass plate which does not have elasticity.

The main light source 42 is fixed to one end of the support member 58, and the line sensor 44 is fixed to the other end of the support member 58. The main light source 42 and the line sensor 44 are extended in the breadth direction of the electro-developing recording medium 30, i.e., the vertical direction in FIG. 3. The scanner optical system 43 is provided close to the line sensor 44 with respect to the electro-developing recording medium 30. The marking light source 73 is provided close to the main light source 42 and is extended in parallel to the main light source 42. The electro-developing recording medium 30 is disposed between the main light source 42 and the scanner optical system 43, and is extended in a direction horizontally perpendicular to the optical axis of the photographing optical system 12.

A rack 101 is formed on a lower surface of the recording medium holder 30h. A pinion 103 is fixed to an output shaft of a feeding motor 102, which is a part of the recording medium moving mechanism 80 (see FIG. 2), and is meshed with the rack 101. Therefore, when the feeding motor 102 is driven, the recording medium holder 30h is moved in accordance with the rotational amount of the pinion 103. Similarly, a rack 104 is formed on a lower surface of the color filter 91, and a pinion 106 fixed to an output shaft of a feeding motor 105, which is a part of the filter drive mechanism 71 (see FIG. 2), is meshed with the rack 104. Therefore, when the feeding motor 105 is driven, the color filter 91 is moved in accordance with the rotational amount of the pinion 106.

There is a constant interval between each of the image recording areas 30a in the electro-developing recording medium 30. In the photographing operation and the non-operating condition, the electro-developing recording medium 30 is positioned in such a manner that the center of one of the image recording areas 30a is approximately aligned with the optical axis of the photographing optical system 12. At that time, the scanner optical system 43 and the line sensor 44 are disposed at positions corresponding to an end portion of the image recording area 30a.

When one photographing operation ends and the scan start switch 53 is depressed, the feeding motor 102 is driven, so that the electro-developing recording medium 30 is moved until the center of the next image recording area 30a becomes coincident with the optical axis of the photographing optical system 12. Namely, the image recording area 30a is moved in a direction horizontally perpendicular and parallel to the longitudinal direction of the line sensor 44. In this movement, the image recording area 30a, which had been positioned behind the photographing optical system 12 when this movement started, is now moved between the light source 42 and the scanner optical system 43, so that an image developed in the image recording area 30a is read by the line sensor 44. Note that the positioning of the image recording area 30a to the photographing optical system 12 is carried out based on the number of pulse signals by which the feeding motor 102 is driven, and the counting of the pulse signals is started at a position where the tip portion of the electro-developing recording medium 30 is engaged with a recording medium sensing switch (not shown).

Figure 4:
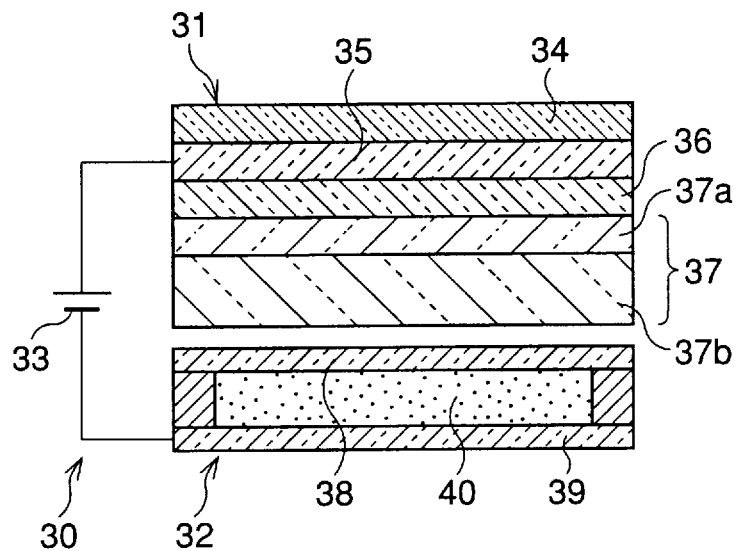
FIG. 4 is a sectional view showing a structure of the electro-developing recording medium.

FIG. 4 shows a structure of the electro-developing recording medium 30, which is basically the same as that shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that ON-OFF control of the electric power source 33 is an operation in which the recording medium drive circuit 41 applies a voltage to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an object image is developed. Namely, the visible image is generated in accordance with the electric charge.

The electric charge storage medium 32 is a liquid crystal display (i.e., LCD) having a memory-type liquid crystal, and thus, the developed visible image is held therein even if the electric field is removed. The developed visible image of the LCD can be erased by heating it, using a laser beam at a predetermined temperature. In such a case, the same electric charge storage medium 32 can be used repeatedly.

Figure 5:
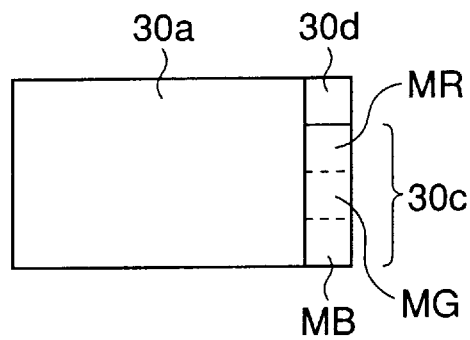
FIG. 5 is a view showing a first example of a construction of an image recording area and portions close thereto.

FIG. 5 shows a first example of a construction of the image recording area and portions close thereto. A recognition area 30c is formed adjacent to the right side of the image recording area 30a, and a positioning mark recording area 30d is formed adjacent to the upper end of the recognition area 30c. Three recognition marks MR, MG, and MB can be optically recorded in the recognition area 30c, and are recorded in different portions. The recognition marks MR, MG, and MB are recorded at the same time when R-images, G-images, and B-images are recorded in the image recording areas 30a. For example, the recognition mark, MR indicating that the color is red, is recorded in the recognition area 30c of the image recording area 30a in which the red image is recorded.

The recognition marks MR, MG, and MB and the positioning mark recording area 30d are rectangular and are identical in size with each other. Portions where the recognition marks MR, MG, and MB and the positioning mark recording area 30d are provided are not only restricted to a right or left side of the image recording area 30a, or an upper or lower side of the image recording area 30a. If the portions are provided such that the recognition marks MR, MG, and MB and the positioning mark recording area 30d are read prior to the reading of the image recorded in the image recording area 30a, by the line sensor 44, the color of the image can be judged before the image is read.

Figure 6:
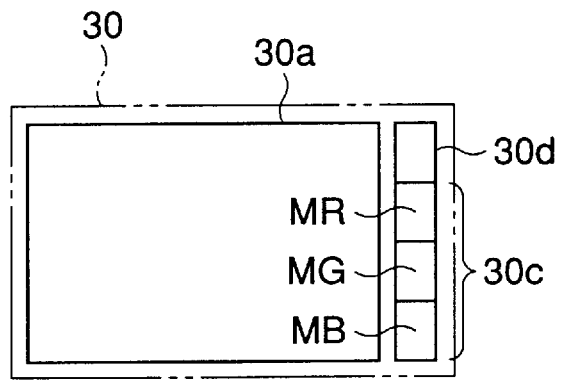
FIG. 6 is a view showing a second example of a construction of the image recording area, a recognition area, and a positioning mark recording area.

FIG. 6 shows a second example of a construction of the image recording area 30a, the recognition area 30c, and the positioning mark recording area 30d. In this example, the recognition area 30c and the positioning mark recording area 30d are formed separate from the image recording area 30a, and the recognition marks MR, MG, and MB are recorded in predetermined portions in the recognition area 30c.

Figure 7:
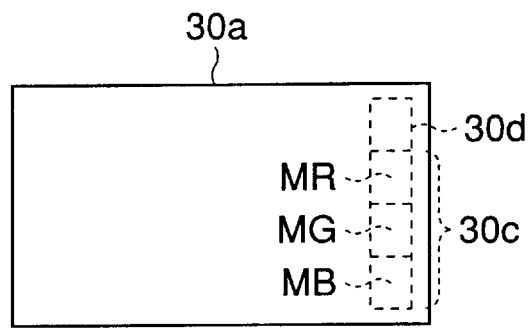
FIG. 7 is a view showing a third example of a construction of the image recording area, the recognition area, and the positioning mark recording area.

FIG. 7 shows a third example of a construction of the image recording area 30a, the recognition area 30c, and the positioning mark recording area 30d. In this example, the recognition area 30c and the positioning mark recording area 30d are formed within the image recording area 30a.

Figure 8:
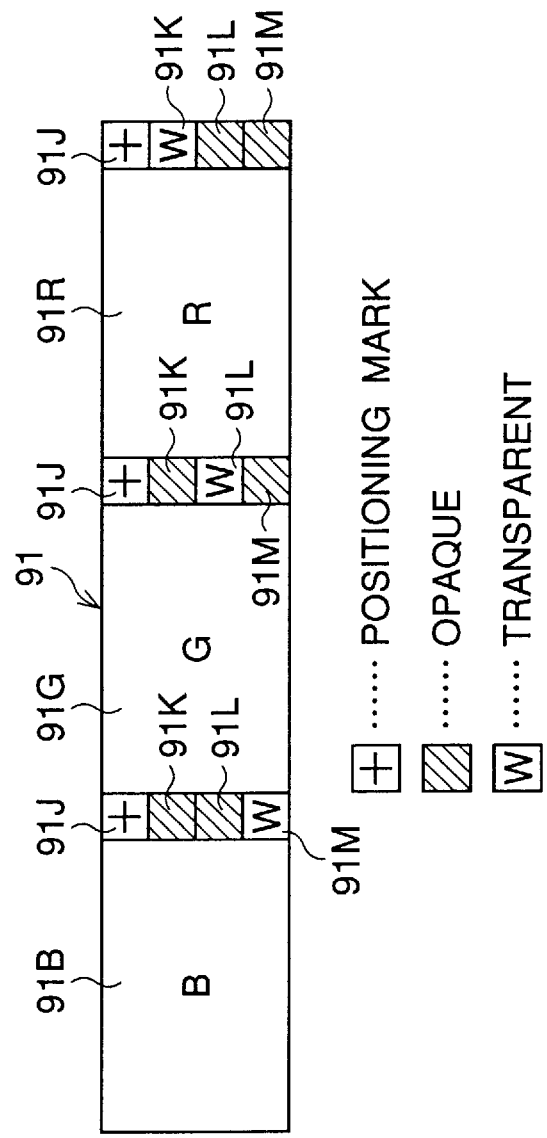
FIG. 8 is a view showing a first example of a color filter.

FIG. 8 shows the first color filter 91. The R filter element 91R, the G filter element 91G, and the B filter element 91B are disposed in this order from the right to left in this drawing.

Four rectangular filter elements are formed in the right side of the R filter element 91R. The first filter element 91J, disposed at the uppermost position, is provided for forming a positioning mark, and a black mark "+", for example, is formed in the first filter element 91J. Namely, when the color filter 91J is used, the positioning mark "+" is recorded in the positioning mark recording area 30d (see FIGS. 5, 6, and 7) of the electro-developing recording medium 30.

The second filter element 91K, disposed at the second from the uppermost position, is a transparent filter. The third filter element 91L and the fourth filter element 91M, disposed at the third from the uppermost position and the lowest position, respectively, are light cut-off filters which halt the progress of a light beam. Namely, when this color filter 91 is used, the recognition mark MR (see FIG. 5, 6, and 7) is recorded in a portion immediately under the positioning mark recording area 30d, in the recognition area 30c corresponding to the image recording area 30a in which the R-image is recorded.

Similarly, four rectangular filter elements are formed in the right side of the G filter element 91G. The first filter element 91J is provided for forming the positioning mark. In this G filter element 91G, the third filter element 91L is the transparent filter, and the second and fourth filter elements 91K and 91M are the light cut-off filters. Therefore, when this color filter 91 is used, the positioning mark "+" is recorded in the positioning mark recording area 30d, and the recognition mark MG is recorded in the central portion of the recognition area 30c corresponding to the image recording area 30a in which the G-image is recorded (see FIG. 5, 6, and 7).

In the case of the B filter element 91B, similarly to the other filter elements 91R and 91G, the first filter element 91J is provided for forming the positioning mark, and the fourth filter element 91M is the transparent filter. The second and third filter elements 91K and 91L are the light cut-off filters. Therefore, when this color filter 91 is used, the positioning mark "+" is recorded in the positioning mark recording area 30d, and the recognition mark MB is recorded in the lowest portion of the recognition area 30c corresponding to the image recording area 30a in which the B-image is recorded (see FIG. 5, 6, and 7).

Figure 9:
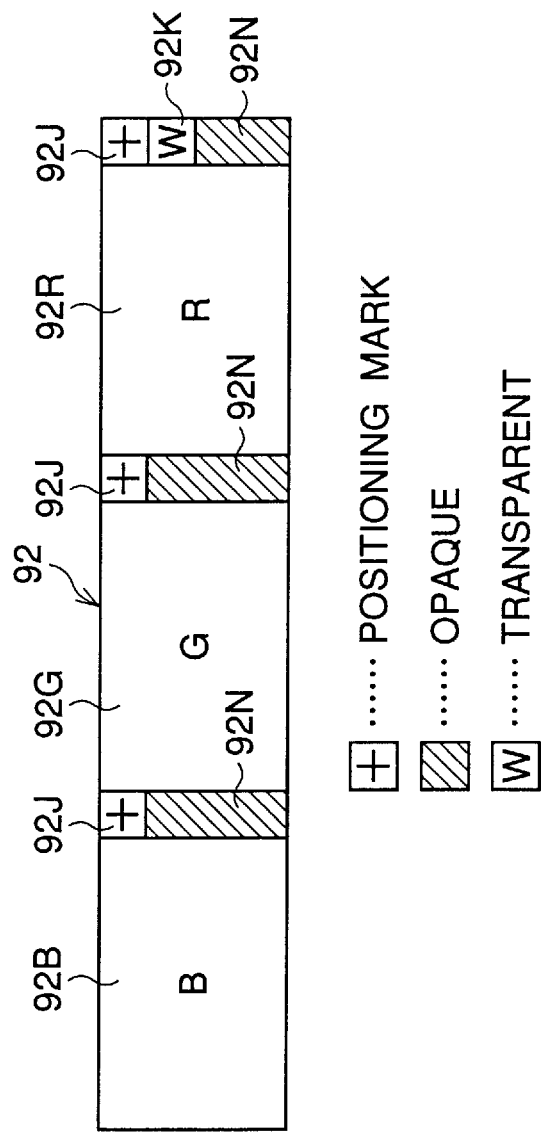
FIG. 9 is a view showing a second example of the color filter.

FIG. 9 shows a second color filter 92 which is a different example from the first color filter 91. In this example, an R filter element 92R, a G filter element 92G, and a B filter element 92B are disposed in this order from the right to the left in this drawing, similar to the first color filter 91. However, the construction of the filter elements for recording the positioning marks and the recognition marks is different from the first color filter 91.

A first filter element 92J, by which the positioning mark is recorded, is formed on the uppermost portion of the right side of the R filter element 92R, similar to the first color filter 91. A second filter element 92K, which is a transparent filter, is formed under the first filter element 92J, and a light cut-off filter element 92N is formed under the second filter element 92K. Conversely, regarding both the G filter element 92G and the B filter element 92B, no transparent filter is provided under the first filter element 92J, but only the light cut-off filter 92N is provided. Namely, when the second color filter 92 is used, the recognition mark MR is recorded only in the recognition area 30c adjacent to the image recording area 30a in which the R-image is recorded, and no recognition mark is recorded in the recognition area of the image recording area in which the G or B-image is recorded.

Figure 11:
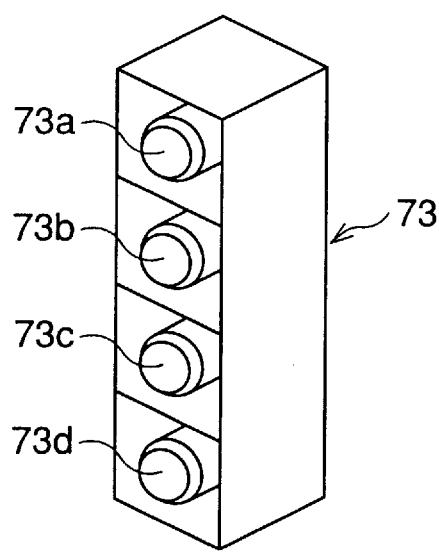
FIG. 11 is a perspective view showing a marking light source provided when the third color filter shown in FIG. 10 is used.

When the first or second color filter 91 or 92 is used, the marking light source 73, which is shown in FIG. 11 described later, can be used, but first through fourth light-emitting elements 73a through 73d do not have to be provided as the marking light source 73. Namely, the light-emitting element can be a single linear light source extending in parallel to the recognition area 30c and the positioning mark recording area 30d.

Figure 10:
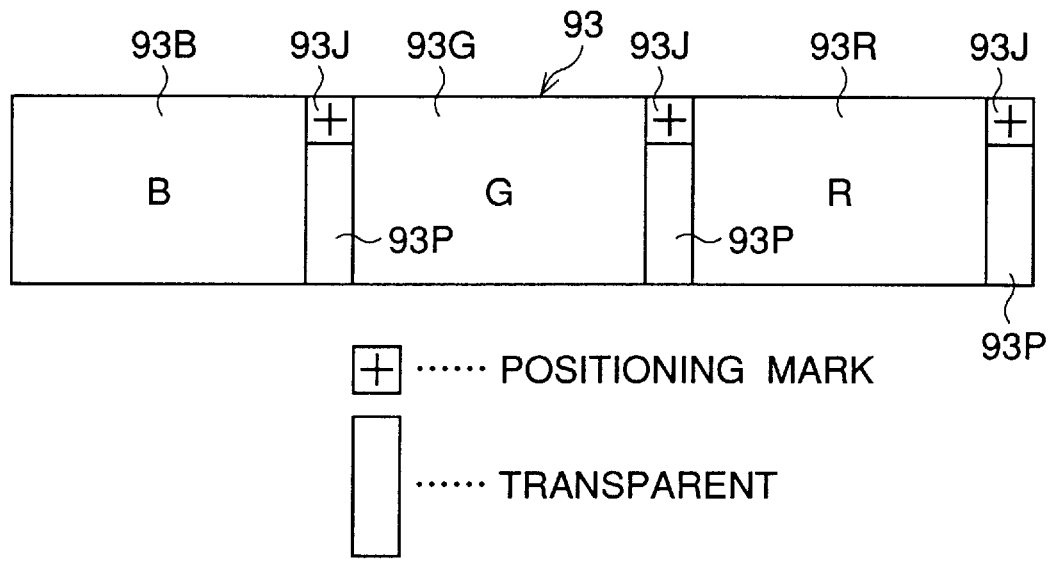
FIG. 10 is a view showing a third example of the color filter.

FIG. 10 shows a third color filter 93. In this example, an R filter element 93R, a G filter element 93G, and a B filter element 93B are disposed in this order from the right to the left in this drawing, similar to the first and second color filters 91 and 92. However, the construction of the filter elements, for recording the positioning marks and the recognition marks, are different from the first and second color filters 91 and 92.

A first filter element 93J, by which the positioning mark is recorded, is formed on the uppermost portion of the right side of the R, G, and B filter elements 93R, 93G, and 93B, similar to the first and second color filters 91 and 92. In each of the filter elements 93R, 93G, and 93B, a transparent filter element 93P, which is a rectangle extending in a vertical direction, is formed under the first filter element 93J. Namely, a construction of the filter element provided on a right side of each of the color filter elements 93R, 93G, and 93B is common to each of the color filter elements, and a mark indicating an R-images, G-images, or B-image is recorded by a light beam radiated by the marking light source 73 shown in FIG. 11.

FIG. 11 shows the marking light source 73 provided when the third color filter 93 is used. This marking light source 73 has four light-emitting diodes (LED). A first LED 73a disposed at the uppermost portion is provided for recording the positioning mark in the positioning mark recording area 30d (see FIG. 5) of the electro-developing recording medium 30. Second, third, and fourth LEDs 73b through 73d, disposed under the first LED 73a, are all of a uniform, single color and are provided for recording the recognition marks MR, MG, and MB in the recognition area 30c (see FIG. 5). Namely, when the third color filter 93 is used, the recognition marks MR, MG, and MB are optically recorded, in the same color, in predetermined portions corresponding to each of the image recording areas, in a similar fashion in which the first color filter shown in FIG. 8 is used.

Figure 12:
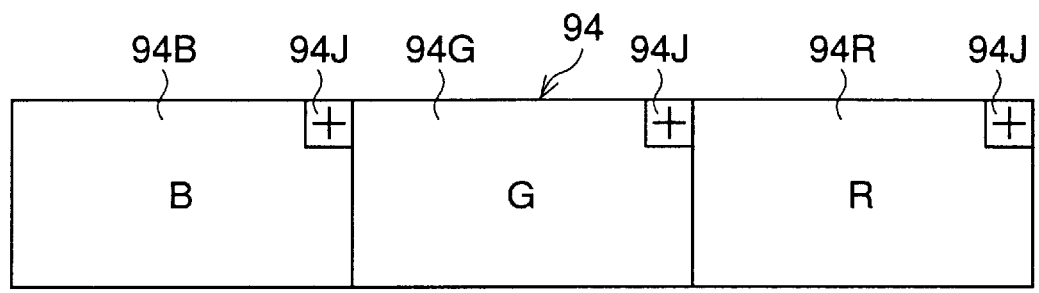
FIG. 12 is a view showing a fourth example of the color filter.

FIG. 12 shows a fourth color filter 94. In this example, an R filter element 93R, a G filter element 93G, and a B filter element 93B are disposed in this order from the right to the left in this drawing, similar to the first, second, and third color filters 91, 92, and 93, but the construction of the filter elements for recording the positioning marks and the recognition marks are different from the first, second, and third color filters 91, 92, and 93.

In the fourth color filter 94, a filter element 94J, by which the positioning mark is recorded, is formed on the uppermost portion of the right side of R, G, and B filter elements 94R, 94G, and 94B. This element serves also as a filter element for recording the recognition marks MR, MG, and MB. Namely, when the fourth color filter 94 is used, the marking light source 73 has the LEDs 73a through 73d arranged in the same way as shown in FIG. 11, but the components of the light radiated by the second, third, and fourth LEDs 73b, 73c, and 73d are different from each other. Namely, the light radiated from the second LED 73b employs the appropriate wavelengths so as to appear red, the light radiated from the third LED 73c employs the appropriate wavelengths so as to appear green, and the light radiated from the fourth LED 73d employs the appropriate wavelengths so as to appear blue. In other words, the recognition marks MR, MG, and MB are recorded by the corresponding LEDs whose light has predetermined wave lengths and therefore, a predetermined color.

Conversely, when a monochromatic image is recorded in the electro-developing recording medium 30, none of the color filters 91, 92, 93, and 94 are used, so that the recognition area 30c and the positioning mark recording area 30d (see FIG. 5) of the electro-developing recording medium 30 are exposed by light which is substantially uniformly distributed. Therefore, in a state in which a positioning mark is not recorded in the positioning mark recording area 30d, or in a state in which the recognition area 30c is uniformly exposed, it is deemed that a monochromatic image is recorded in the corresponding image recording area 30a. In other words, the state when the recognition area 30c is uniformly exposed implies the recognition mark indicating the monochromatic image, and this recognition mark is recorded in the same portions as the recognition marks MR, MG, and MB.

Figure 13:
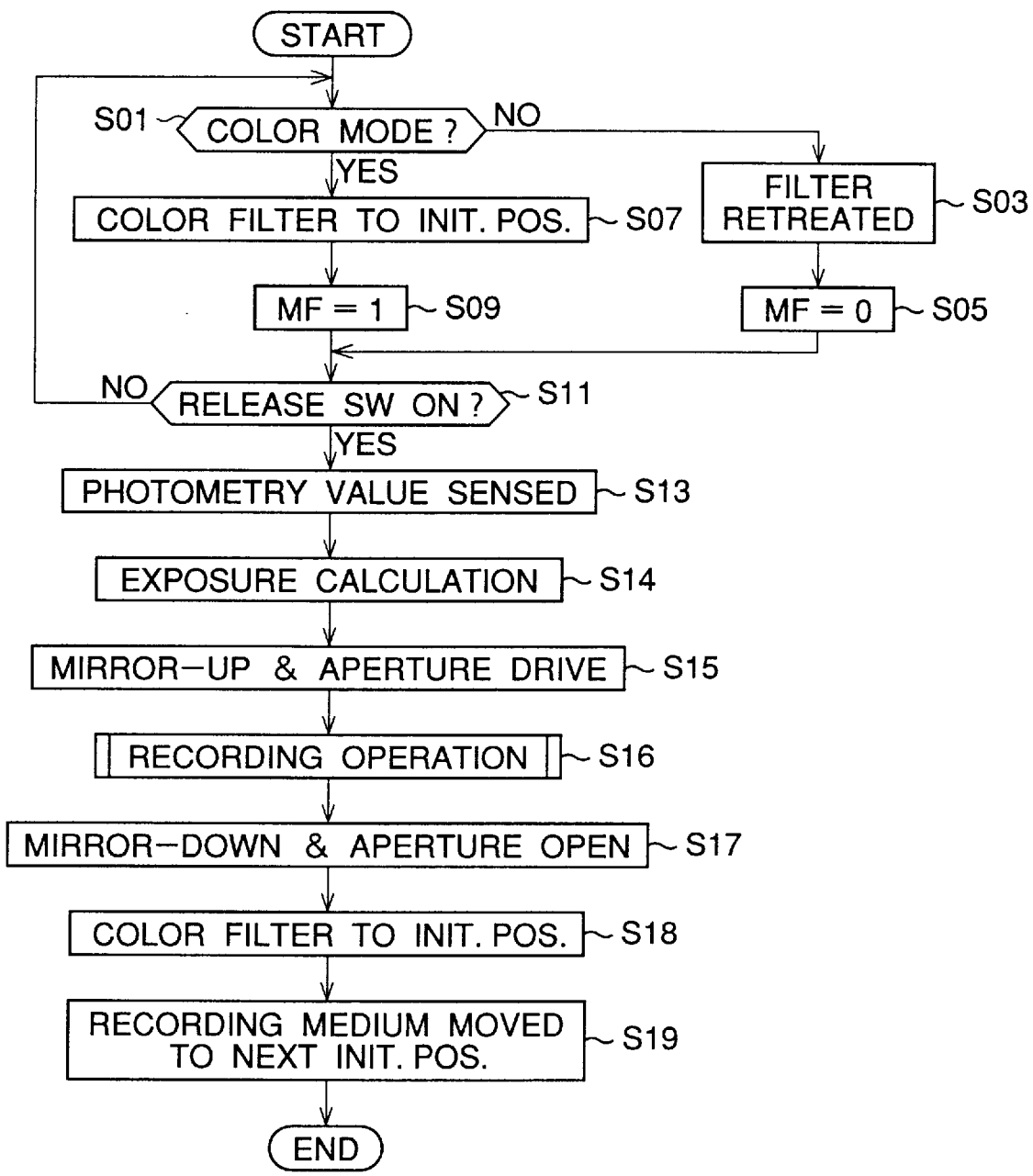
FIG. 13 is a flow chart of a photographing operation program.

FIG. 13 is a flow chart showing a photographing operation program. This photographing operation program is executed by partly depressing the release button 56.

In Step S01, it is determined whether the color photographing mode is set. When the color photographing mode is not set, the process goes to Step S03 so that a monochromatic image is recorded. In Step S03, the color filter 91 (or 92, 93, 94) is retreated to the outside of the optical path of the photographing optical system 12, and in Step S05, a parameter MF is set to 0, which indicates a monochromatic photographing mode.

Conversely, when the color photographing mode is set, the process goes to Step S07, in which the color filter 91 (or 92, 93, 94) is positioned at an initial position to carry out the color photographing operation. Namely, the R color filter element 91R (or 92R, 93R, 94R) is set in the optical path of the photographing optical system 12. In Step S09, the parameter MF is set to 1, which indicates a color photographing mode.

Thus, after the parameter is set to 0 or 1 in Step S05 or S09 respectively, Step S11 is executed, in which it is determined whether the release switch is turned OFF. When it is determined that the release switch is turned OFF, the process returns to Step S01, and when it is determined that the release switch is turned ON, the process goes to Step S13, in which the output signal of the photometry sensor 28, i.e., the photometry value, is sensed. Then, in Step S14, an exposure calculation is carried out based on the photometry value, so that the opening degree of the aperture 12a and the shutter speed (i.e., the exposure period) are obtained.

In Step S15, the quick return mirror 21 is changed from the down position to the up position, and the opening degree of the aperture 12a is changed from the full open to a predetermined opening degree. Then, in Step S16, a recording operation program to be described later, is executed, so that a monochromatic or color image is recorded in the electro-developing recording medium 30.

In Step S17, the mirror 21 is changed to the down position and the aperture 12a is opened to the fully open condition. In Step S18, the color filter 91 (or 92, 93, 94) is moved to the initial position, and in Step S19, the electro-developing recording medium 30 is set to the next initial position, and thus, the next image recording area 30a is positioned in the optical path of the photographing optical system 12. Thus, the photographing operation program ends.

Figure 14:
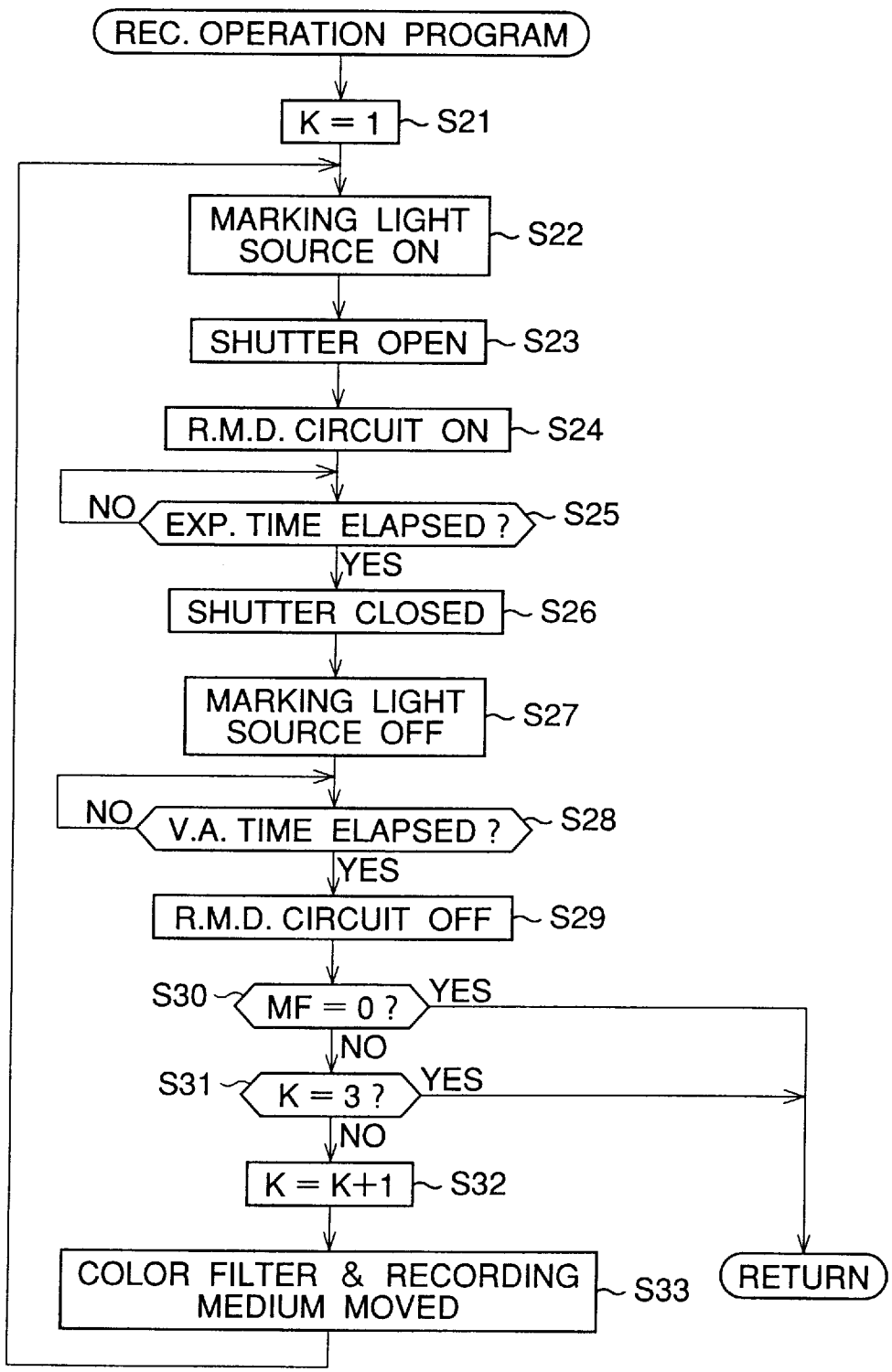
FIG. 14 is a flow chart of a first recording operation program.

FIG. 14 is a flow chart showing a first recording operation program. This first recording operation program is executed when the first and second color filters 91 and 92 (see FIGS. 8 and 9) are used. In this explanation, the flow chart shown in FIG. 14 is described while supposing that the recording operation is performed in the color photographing mode.

As the initial condition, the electro-developing recording medium 30 is set in such a manner that the center of the predetermined image recording area 30a is positioned on the optical axis of the photographing optical system 12, and the recognition area 30c and the positioning mark recording area 30d face the marking light source 73. The color filter 91 (or 92) is set in such a manner that the R filter element 91R (or 92R) is positioned on the optical axis of the photographing optical system 12.

In step S21, a parameter K is set to 1, which implies that an R-image is to be recorded. In Step S22, the marking light source 73 is turned ON, so that the LEDs provided in the marking light source 73 are lit. Thus, a positioning mark is recorded in the positioning mark recording area 30d, and a recognition mark MR is recorded in the uppermost position of the recognition area 30c, corresponding to the R-image.

In step S23, the shutter 22 is opened, and in Step S24, the recording medium drive circuit 41 is driven so that a voltage is applied to the electro-developing recording medium 30. In step S25, it is determined whether a predetermined exposure time has elapsed since the shutter 22 is opened in Step S22. When the exposure time has elapsed, the shutter 22 is closed in Step S26. In Step S27, the marking light source 73 is turned OFF. When it is confirmed, in Step S28, that a predetermined voltage application time has elapsed since the start of the voltage application in Step S24, the recording medium drive circuit 41 is turned OFF, (Step S29), so that the voltage application to the electro-developing recording medium 30 is stopped.

Thus, the R-image is recorded in the image recording area 30a of the electro-developing recording medium 30. Further, the positioning mark is recorded in the positioning mark recording area 30d corresponding to the image recording area 30a, and the R recognition mark MR is recorded in the uppermost portion of the recognition area 30c.

In step S30, it is determined whether the parameter MF is 0. As described with reference to FIG. 13, the parameter MF is 0 in the monochromatic photographing mode, and 1 in the color photographing mode. If the monochromatic photographing mode is set, this program ends immediately after the execution of Step S30. However, in this explanation, since it is supposed that the color photographing mode is set, the process goes to Step S31, in which it is determined whether parameter K is equal to 3. Since parameter K is 1, parameter K is incremented by 1 in Step S32, and then Step S33 is executed, so that the color filter 91 (or 92) and the electro-developing recording medium 30 are advanced by the distance corresponding to one frame of an image, respectively. Thus, the color filter 91 (or 92) is set to a position such that the G filter element 91G (or 92G) is positioned on the optical axis of the photographing optical system 12, and the electro-developing recording medium 30 is set to a position such that the next image recording area 30a is positioned on the optical axis of the photographing optical system 12.

Then, Steps S22 through S29 are executed again, so that a G-image is recorded in the image recording area 30a, and the positioning mark is recorded in the positioning mark recording area 30d corresponding to the image recording area 30a, and the G recognition mark MG is recorded in the center portion of the recognition area 30c. Note that, when the second color filter 92 shown in FIG. 9 is used, the recognition mark MG is not recorded.

After the G-image is recorded, Steps S30, S31, and S32 are executed in this order, and thus, the parameter K is set to 3. Then, in Step S33, the B filter element 91B (or 92B) and the next image recording area 30a are positioned on the optical axis of the photographing optical system 12, respectively, and Steps S22 through S29 are executed. Namely, the B-image is recorded in the next image recording area 30a, and the positioning mark is recorded in the positioning mark recording area 30d corresponding to the image recording area 30a, and the B recognition mark MB is recorded in the lowest portion of the recognition area 30c. Note that, when the second color filter 92 is used, the recognition mark MB is not recorded.

After the B-image is recorded, it is determined in Step S31 that the parameter K is 3, and thus this recording operation program ends.

Conversely, when the monochromatic photographing mode is set, although Steps S22 through S29 are executed in the same way as described above, since the color filter 91 (or 92) is not positioned on the optical axis of the photographing optical system 12, the positioning mark recording area 30d and the recognition area 30c are entirely exposed by turning ON the LEDs of the marking light source 73 in Step S22. Namely, the positioning mark and the recognition mark are not recorded in the positioning mark recording area 30d and the recognition area 30c. Thus, after an image is recorded in the image recording area 30a, it is determined in Step S30 that the parameter MF is 1, and thus this recording operation program ends.

Figure 15A:
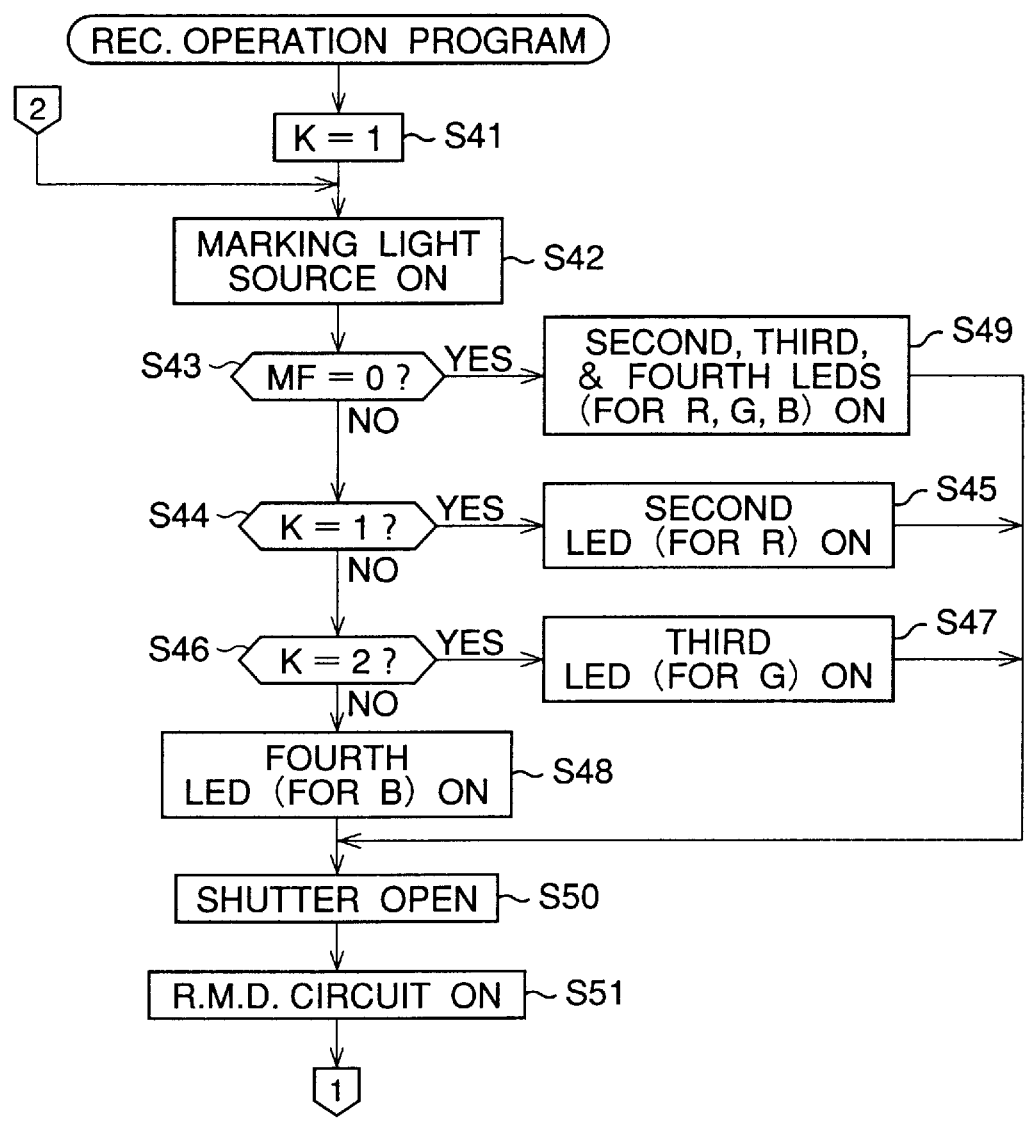
FIGS. 15A and 15B are flow charts showing a second recording operation program.
Figure 15B:
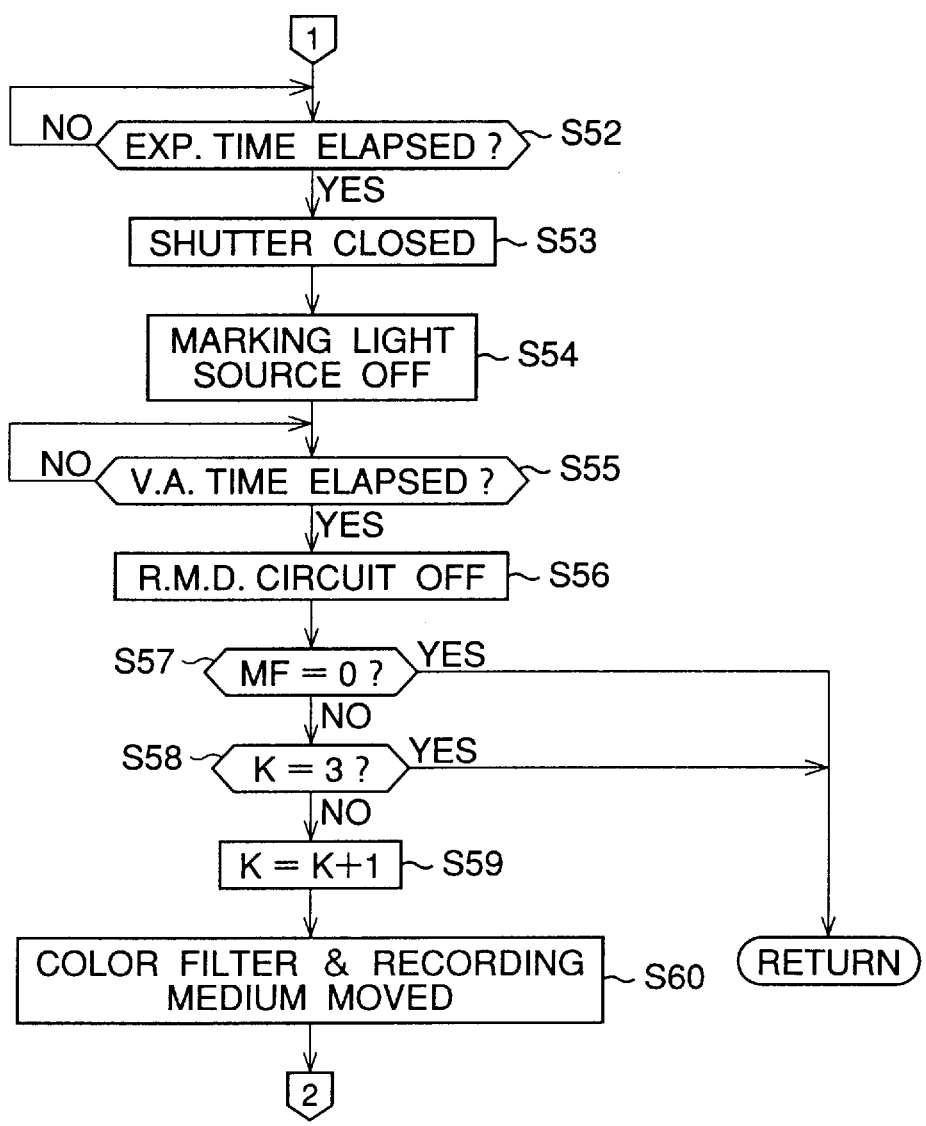
Figure 16A:
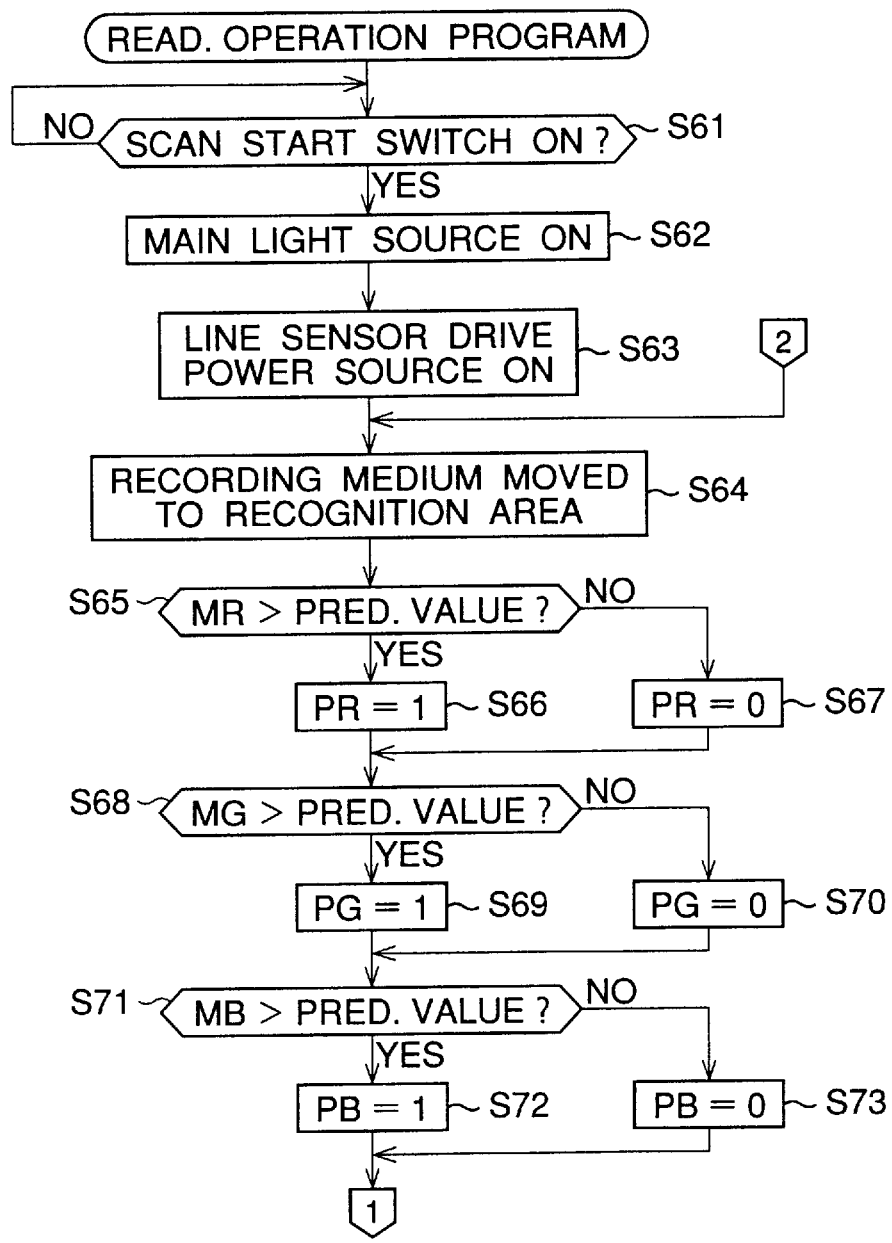
FIGS. 16A, 16B, 16C, and 16D are flow charts showing a reading operation program.
Figure 16B:
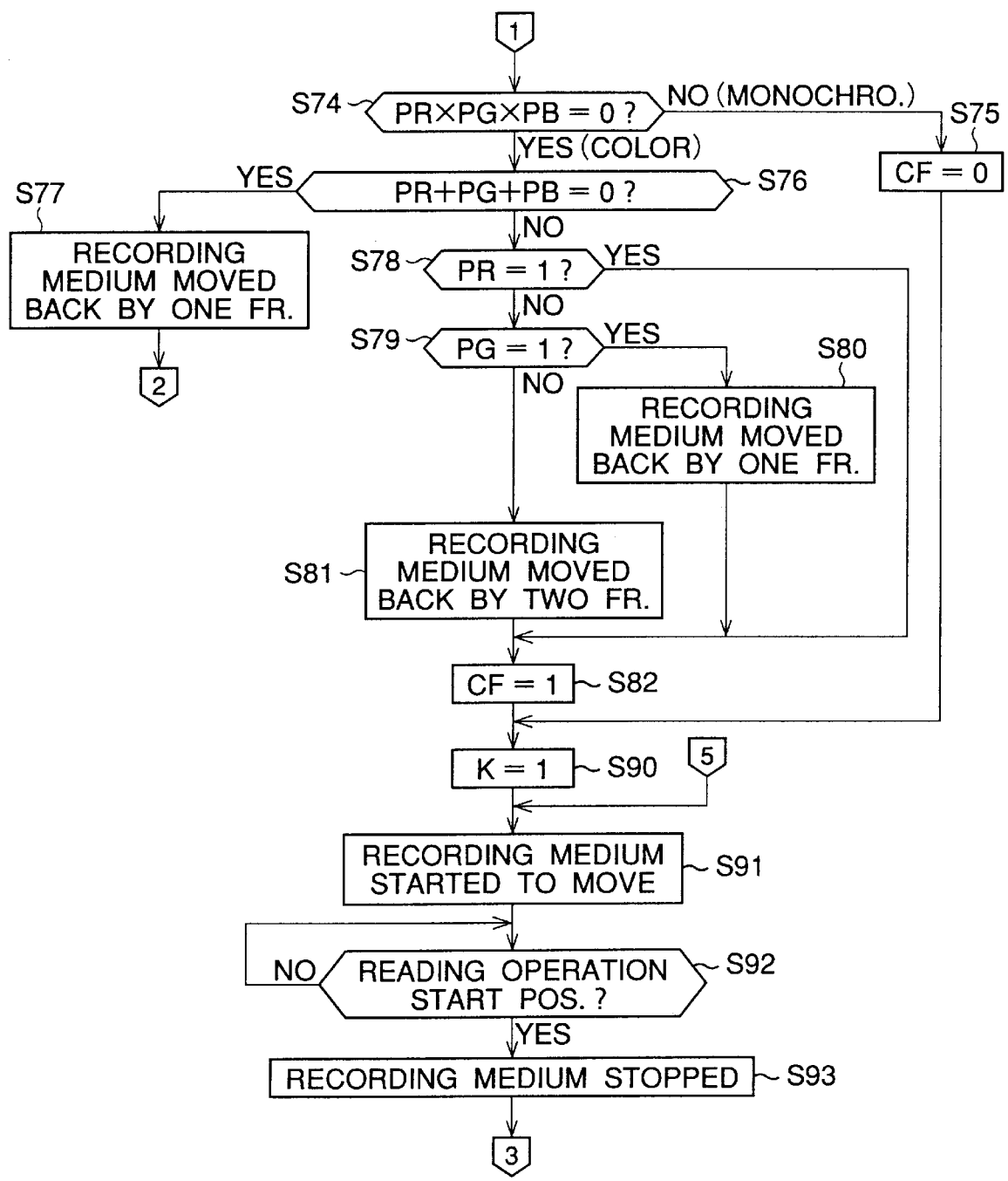
Figure 16C:
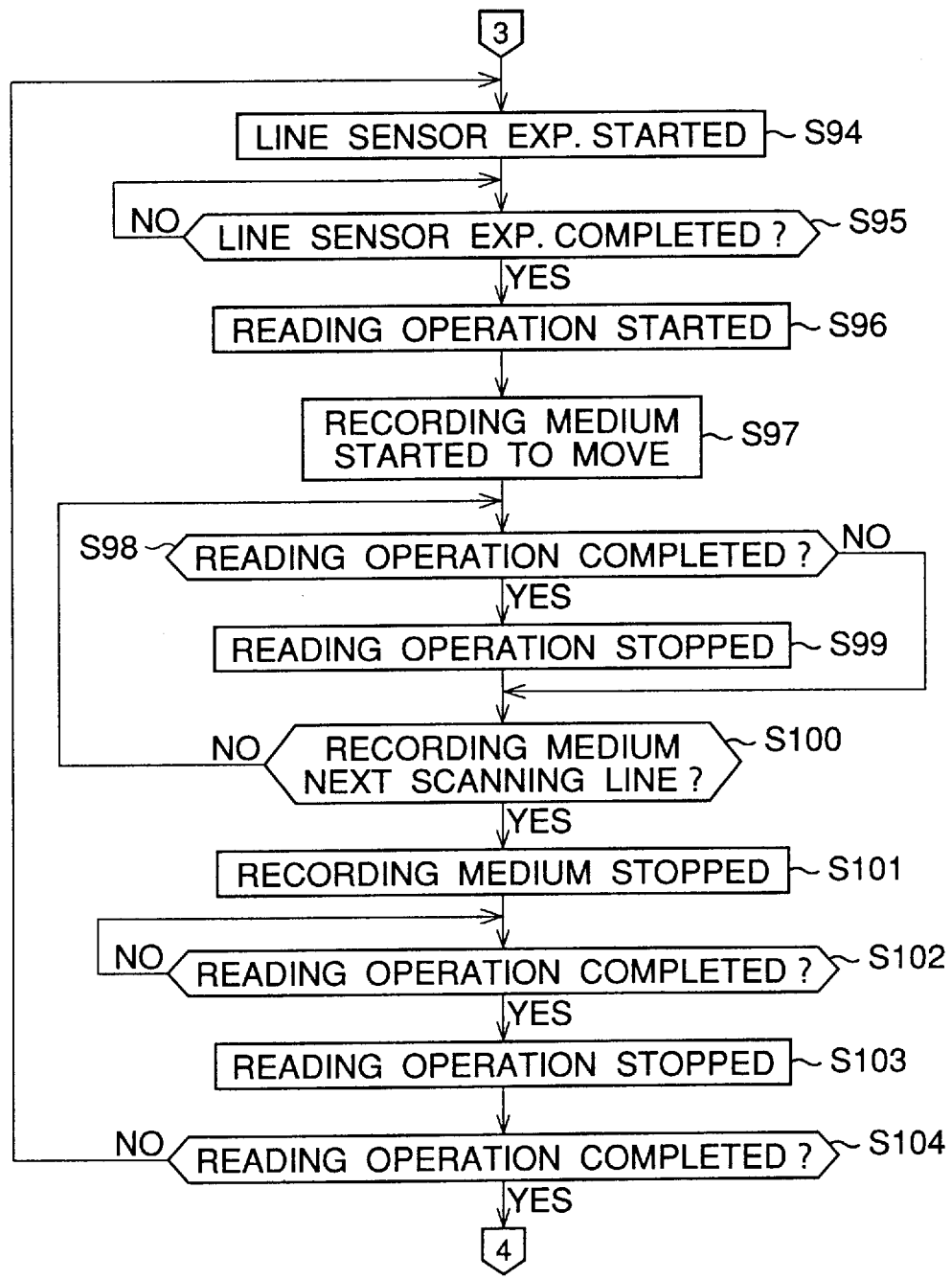
Figure 16D:
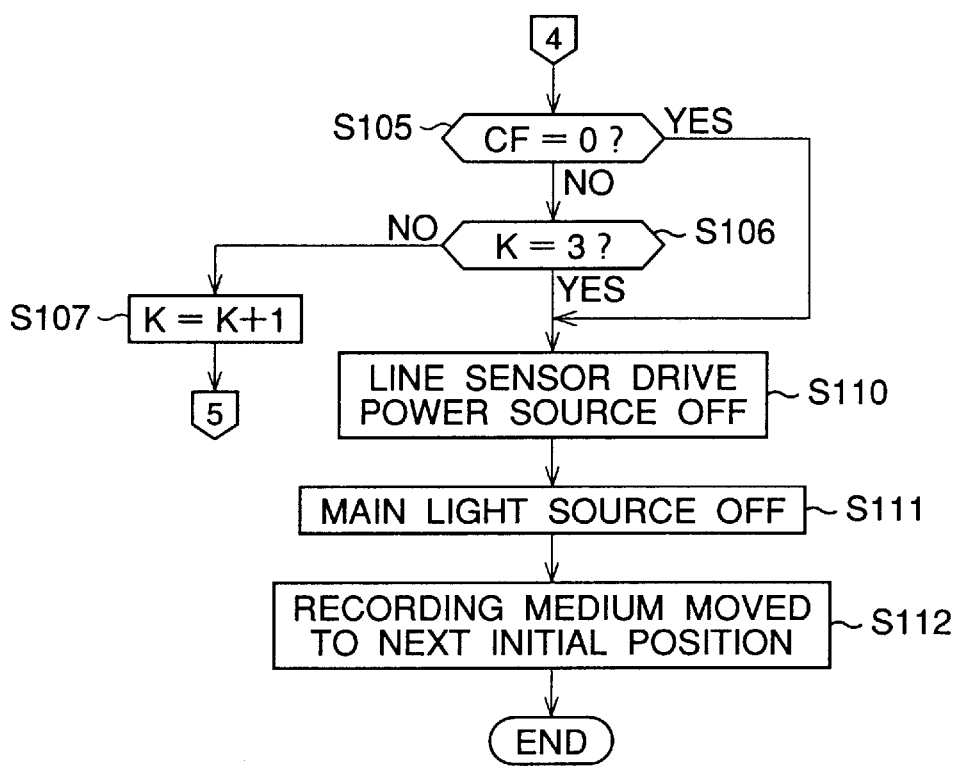

FIGS. 15A and 15B are flow charts showing a second recording operation program. This second recording operation program is executed when the third and fourth color filters 93 and 94 (see FIGS. 10 and 12) are used. In this explanation, the flow charts shown in FIGS. 15A and 15B are described while supposing that the recording operation is performed in the color photographing mode.

The initial condition is the same as the first recording operation program, and the electro-developing recording medium 30 and the color filter 93 (or 94) are positioned so that an R-image can be recorded in the image recording area 30a.

In Step S41, parameter K is set to 1. Similar to the first recording operation program, when parameter K is 1, 2, and 3, R-image, G-image, and B-images are recorded, respectively. In step S42, the marking light source 73 is driven, the first LED 73a (see FIG. 11) for recording the positioning mark is lit. In step S43, it is determined whether the parameter MF is 0. Now, the recording operation program is set so that the color photographing mode is performed, and thus, the parameter MF is 1. Therefore, the process goes from Step S43 to Step S44. Since it is determined in Step S44 that parameter K is 1, Step S45 is executed, in which the marking light source 73 is driven, so that the second LED 73b (see FIG. 11) for recording the R recognition mark MR is lit.

Then, Step S50 is executed so that the shutter 22 is opened. In Step S51, the recording medium drive circuit 41 is driven so that a voltage is applied to the electro-developing recording medium 30. It is determined in Step S52 whether a predetermined exposure time has elapsed since the shutter 22 is opened, and when the exposure time has elapsed, Step S53 is executed, in which the shutter 22 is closed. In step S54, the marking light source 73 is turned OFF. Then, when it is confirmed in Step S55 that a predetermined voltage application time has elapsed since the start of the voltage application in Step S51, the recording medium drive circuit 41 is turned OFF in Step S56, so that the voltage application to the electro-developing recording medium 30 is stopped.

Thus, the R-image is recorded in the image recording area 30a of the electro-developing recording medium 30. Further, the positioning mark is recorded in the positioning mark recording area 30d corresponding to the image recording area 30a, and the R recognition mark MR is recorded in the uppermost portion of the recognition area 30c.

In Step S57, it is determined whether the parameter MF is 0. Now, since the parameter MF is not 0, the process goes to Step S58, in which it is determined whether parameter K is 3. Now, since parameter K is 1, Step S59 is executed in which parameter K is incremented by 1, and Step S60 is executed in which the color filter 93 (or 94) and the electro-developing recording medium 30 are advanced by the distance corresponding to one frame image, respectively. Thus, the color filter 93 (or 94) is set on the optical axis of the photographing optical system 12, and the electro-developing recording medium 30 is positioned in such a manner that the next image recording area 30a is positioned on the optical axis of the photographing optical system 12.

Then, the process returns to Step S42, and thus, Steps S43, S44, S46 are executed in this order. Since parameter K has been set to 2, the process goes from Step S46 to S47, in which the marking light source 73 is driven, so that the third LED 73c (see FIG. 11) for recording the G recognition mark MG is lit. Then, Steps S50 through S56 are executed. Namely, a G-image is recorded in the image recording area 30a, the positioning mark is recorded in the positioning mark recording area 30d, corresponding to the image recording area 30a, and the G recognition mark MG is recorded in the center portion of the recognition area 30c.

After the G-image is recorded, Steps S57, S58, and S59 are executed in this order, and thus, parameter K is set to 3. Then, in Step S60, the B filter element 93B (or 94B) and the next image recording area 30a are positioned on the optical axis of the photographing optical system 12, respectively, and the process returns to Step S42.

At this time, since parameter K is 3, the process goes from Step S46 to Step S48, in which the marking light source 73 is driven, so that the fourth LED 73d (see FIG. 9) for recording the B recognition mark MB is lit. Then, Steps S50 through S56 are executed again, and thus, the B-image is recorded in the image recording area 30a, the positioning mark is recorded in the positioning mark recording area 30d corresponding to the image recording area 30a, and the B recognition mark MB is recorded in the center portion of the recognition area 30c.

After the B-image is recorded, it is determined in Step S58 that parameter K is 3. Therefore, this recording operation program ends.

Conversely, when the monochromatic photographing mode is set, since it is determined in Step S43 that parameter MF is 0, the process goes from Step S43 to Step S49, in which the second, third, and fourth LEDs 73b, 73d, and 73e of the marking light source 73 are lit, so that the recognition area 30c is entirely exposed. Thus, the recognition mark indicating a monochromatic image is recorded in the recognition area 30c. Thus, after an image is recorded in the image recording area 30a, it is determined in Step S57 that parameter MF is 0, and thus this recording operation program ends.

FIGS. 16A, 16B, 16C, and 16D are flow charts showing a reading operation program, by which an image recorded in the electro-developing recording medium 30 is read and reproduced. This reading operation program is interruptedly executed during every predetermined time period. Note that this reading operation program is common to all of the cases in which any one of the color filters 91, 92, 93, and 94 shown in FIGS. 8, 9, 10, and 12 are used.

When it is confirmed in Step S61 that the scan start switch 53 is turned ON, the main light source 42 is lit in Step S62, and the line sensor drive power source provided in the line sensor drive circuit 47 is turned ON in Step S63, so that the line sensor 44 is actuated.

In step S64, the electro-developing recording medium 30 is moved to a position where the recognition area 30c faces the light source 42 and the line sensor 44. This positioning is carried out by an operation in which a shut plate (not shown), which is provided in the recording medium holder 30h, interferes with a photo-interrupter (not shown). Namely, the electro-developing recording medium 30 is stopped at a position based on a signal outputted by the photo-interrupter.

In step S65, based on an image signal read through the line sensor 44, it is determined whether the transmittance of the portion of the recognition area 30c, which corresponds to the recognition mark MR, is greater than a predetermined value. When the transmittance is greater than the predetermined value, i.e., when the recognition mark MR has been recorded, the parameter PR is set to 1 in Step S66. Conversely, when the transmittance is not greater than the predetermined value, parameter PR is set to 0 in Step S67.

In step S68, it is determined whether the transmittance of the portion corresponding to the recognition mark MG is greater than a predetermined value. When the transmittance is greater than the predetermined value, parameter PG is set to 1 in Step S69, and when the transmittance is not greater than the predetermined value, parameter PG is set to 0 in Step S70.

In step S71, it is determined whether the transmittance of the portion corresponding to the recognition mark MB is greater than a predetermined value. When the transmittance is greater than the predetermined value, parameter PB is set to 1 in Step S72, and when the transmittance is not greater than the predetermined value, parameter PB is set to 0 in Step S73.

In step S74, it is determined whether the result obtained by multiplying the parameters PR, PG, and PB is 0. When none of parameters PR, PG, and PB is 0, i.e., when the transmittance of the entire recognition area 30c is greater than a predetermined value, parameter CF is set to 0, indicating the monochromatic photographing mode in Step S75. Then, the process goes to Step S90, so that the monochromatic image recorded in the image recording area 30a is read as described later.

Conversely, when it is determined in Step S74 that the result of multiplication of the parameters PR, PG, and PB is 0, the process goes to Step S76, so that a preparation for the reading operation of the color image is performed.

First, it is determined in Step S76 whether the result obtained by adding the parameters PR, PG, and PB is 0. Suppose that the second color filter 92 shown in FIG. 9 is used. When all of the parameters PR, PG, and PB are 0, i.e., when the transmittance of the entire recognition area 30a is less than a predetermined value, a G-image or a B-image is recorded in the image recording area 30a. Namely, an R-image is not recorded in the image recording area 30a, which is now going to be read. This embodiment is constructed in such a manner that, in the case of a color image, the R-image is read first. Therefore, when all of the parameters PR, PG, and PB are 0, the electro-developing recording medium 30 is moved back by one frame to the image recording area 30a in which an R-image is recorded, and then, the process returns to Step S64, so that Steps S64 through S74 described above are again executed.

When it is determined in Step S76 that the result obtained by adding the parameters PR, PG, and PB is not 0, i.e., when one of the recognition marks MR, MG, and MB is recorded in any portion included in the recognition area 30c, Steps S78 through S82 are executed so that a preparation for the reading operation for the image recording area 30a in which the R-image is recorded is performed.

When it is determined in Step S78 that parameter PR is 1, i.e., when the recognition mark MR is recorded, the image recording area 30a in which the R-image is recorded is positioned to face the line sensor 44. Accordingly, in this case, parameter CF is set in Step S82 to 1, indicating the color photographing mode, so that the reading operation is immediately started.

Conversely, when it is determined in Step S78 that parameter PR is not 1, Step S79 is executed in which it is determined whether parameter PG is 1. When parameter PG is 1, since the recognition mark MG has been recorded in the recognition area 30c corresponding to the image recording area 30a which is now going to be read, Step S80 is executed in which the electro-developing recording medium 30 is moved back by one frame to the image recording area 30a in which an R-image is recorded. Thus, the image recording area 30a, in which the R-image has been recorded, is set to face the line sensor 44. Then, in Step S82, parameter CF is set to 1.

When it is determined in Step S79 that parameter PG is not 1, the recognition mark MB has been recorded in the recognition area 30c corresponding to the image recording area 30a which is now going to be read. Therefore, Step S81 is executed in which the electro-developing recording medium 30 is moved back by two frames to the image recording area 30a in which an R-image is recorded. Thus, the image recording area 30a, in which the R-image has been recorded, is set to face the line sensor 44. Then, in Step S82, parameter CF is set to 1.

In Step S90, parameter K is set to 1, indicating the R-image. In Step S91, the feeding motor 102 (see FIG. 3) provided in the recording medium moving mechanism 80 (see FIG. 2) is driven, so the movement of the electro-developing recording medium 30 is started. When it is confirmed in Step S92 that the electro-developing recording medium 30 has been set to a reading operation start position, where the line sensor 44 starts to read, Step S93 is executed, in which the feeding motor 102 is stopped, so that the movement of the electro-developing recording medium 30 is stopped. This stopping operation is controlled by, for example, counting pulse signals for driving the feeding motor 102.

In Step S94, an exposure of the line sensor 44 is started, so that an accumulation of an electric charge by the line sensor 44 is performed. When it is confirmed in Step S95, by sensing, for example, that a constant time has passed, that the exposure of the line sensor 44 has been completed, in Step S96, a reading operation of the line sensor 44 is started, and pixel signals of one scanning line are outputted from the line sensor 44. In Step S97, the feeding motor 102 is driven so that the movement of the electro-developing recording medium 30 is started.

During this movement of the electro-developing recording medium 30, when it is confirmed in Step S98 that a reading operation of the line sensor 44 has been completed, the reading operation is stopped in Step S99. This stopping operation is controlled by, for example, counting pulse signals for driving the feeding motor 102. When it is not confirmed in Step S98 that the reading operation has been completed, Step S99 is skipped, so that Step S100 is executed in which it is determined whether or not the electro-developing recording medium 30 has been set to the next scanning position, i.e., the next reading position for the line sensor 44. When the electro-developing recording medium 30 has not been set to the next scanning position, Steps S98 through S100 are executed again.

When it is confirmed in Step 100 that the electro-developing recording medium 30 has been set to the next scanning position, Step S101 is executed, in which the feeding motor 102 is stopped so that the electro-developing recording medium 30 is stopped. This stopping operation is controlled by counting pulse signals, for example, for driving the feeding motor 102. Then, in Step S102, the completion of the reading operation of the line sensor 44 is confirmed, in the same way as for Step S98, and the reading operation is stopped in Step 103. Namely, even when the loop of Steps S98 through S100 ends without executing Step S99, the reading operation of the line sensor 44 is completed in Step S103.

In Step S104, it is determined whether a reading operation for all of the scanning lines has been completed. The number of all of the scanning lines may be, for example, 2000, in Step S104, it is determined whether the counter value, which counts every reading operation of one horizontal scanning line, has reached 2000. When the reading operation of all of the scanning lines has not been completed, the process returns to Step S94, and the operations described above in Steps S94 through S104 are repeated.

When all of the scanning lines have been read, the process goes from Step S104 to Step S105, in which it is determined whether parameter CF is 0. When parameter CF is 0, the drive power source of the line sensor 44 is turned OFF in Step S110, and the main light source 42 is turned OFF in Step Still. In Step S112, the drive signal for driving the feeding motor 102 is outputted, so that the electro-developing recording medium 30 is moved to the next initial position where a reading operation for an image recorded in the next image recording area 30a can be started. Then, this reading operation program ends.

When it is determined in Step S105 that parameter CF is not 0, meaning a color image is being read, it is determined in Step S106 whether parameter K is 3. When parameter K is not 3, i.e., when all of the R-image, G-image, and B-images have not been read, the process goes to Step S107, in which parameter K is incremented by 1. Then, the process returns to Step S91, so that the reading operation for the image recorded in the next image recording area 30a is started.

Thus, when all of the R-image, G-image, and B-images have been read, the process goes from Step S106 to Step S110. Namely, Steps 110 through S112 are executed, and thus, this recording operation program ends.

As described above, the values of parameters PR, PG, and PB are determined based on the recognition marks MR, MG, and MB in Steps S65 through S73, and then, based on these parameters PR, PG, and PB, the image recorded in each of the image recording areas 30a is reproduced. Accordingly, whether the image is monochromatic or color, the image is always reproduced using the appropriate process.

Note that, although the marking light source 73 is provided so that the recognition marks and the positioning mark are recorded in the above embodiment, instead of this construction, a light beam passing through the photographing optical system 12 can be used for recording the recognition marks and the positioning mark. Namely, in this case, although the angle of view becomes small, the color filter may be constructed so as to conform with the arrangements of the image recording areas 30a, the recognition area 30c, and the positioning mark recording area 30d shown in FIG. 7, for example. According to this construction, since the marking light source 73 is not required, the manufacturing cost of the electro-developing type camera is reduced. Further, since the process, in which the marking light source 73 is turned ON and OFF in the recording operation program shown in FIG. 14, is not needed, the control becomes further simplified.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. HEI 8-146654 (filed on May 16, 1996) and HEI 8-317089 (filed on Nov. 13, 1996) which are expressly incorporated herein, by reference, in their entirety.

I claim:

1. A recording device, comprising:
an electro-developing recording medium by which an image formed thereon is electronically developed, said electro-developing recording medium having a plurality of image recording areas in which an image can be recorded, respectively;
an image recording processor that selectively records one of a monochrome image and a color image in at least one of said plurality of image recording areas; and
a recognition mark recording processor that records a recognition mark in a recognition area corresponding to each of said plurality of image recording areas, said recognition mark indicating whether an image recorded in each of said plurality of image recording areas is monochromatic or color.

2. A device according to claim 1, wherein said recognition area is formed adjacent to each of said plurality of image recording areas.

3. A device according to claim 1, wherein said recognition area is formed in a portion separate from each of said plurality image recording areas.

4. A device according to claim 1, wherein said recognition area is formed within each of said plurality image recording areas.

5. A device according to claim 1, wherein said image recording processor records red, green, and blue images in said plurality of image recording areas, and said recognition mark recording processor records a corresponding recognition mark, in said recognition area, when said image recording processor records said red, green, and blue images, said recognition mark indicating a color for an image recorded in each of said plurality of image recording areas.

6. A device according to claim 5, wherein said recognition mark is recorded in a portion in said recognition area, said portion being determined depending upon said color of said image recorded in a corresponding image recording area.

7. A device according to claim 5, wherein said recognition mark is optically recorded.

8. A device according to claim 7, further comprising a filter having a transparent filter element and a light cut-off filter element, said filter being disposed in front of said electro-developing recording medium, said recognition mark being recorded through said filter.

9. A device according to claim 7, wherein said recognition mark is recorded by a light beam having a predetermined wave length.

10. A device according to claim 9, further comprising a plurality of light sources, each light source emitting a luminous flux having said predetermined wave length.

11. A device according to claim 5, further comprising a positioning mark recording processor that records a positioning mark in a portion adjacent to each of said plurality of image recording areas, said positioning mark indicating a positional alignment when superimposing said red, green, and blue images for a color reproduction process.

12. A device according to claim 11, wherein said positioning mark and said recognition mark are recorded in portions adjacent to each other.

13. A device according to claim 5, wherein said recognition mark indicating a monochrome image, which is recorded in said image recording area, is recorded in a same portion as said recognition mark indicating said red, green, and blue images.

14. A device according to claim 1, wherein said image recording processor records red, green, and blue images in said plurality of image recording areas, said recognition mark recording processor recording said recognition mark in said recognition area corresponding to one of said plurality of image recording areas when said image recording processor records said red, green, and blue images, said recognition mark indicating a color of an image recorded in said one of said plurality of image recording areas.

15. A device for recording an image in an image recording area of an electro-developing recording medium, by which an image formed in said image recording area is electronically developed and recorded, said recording device comprising:

a recognition mark recording processor that records a recognition mark in a recognition area corresponding to said image recording area when an image is recorded in said image recording area, said recognition mark indicating whether said image recorded in said image recording area is a monochromatic image or a color image.

16. A device for reproducing an image recorded in an image recording area of an electro-developing recording medium, by which an image formed in said image recording area is electronically developed and recorded, said reproducing device comprising:

an image reproducing processor that reproduces said image indicated in said image recording area, based on a recognition mark indicating whether said image recorded in said image recording area is a monochromatic image or a color image.

* * * * *

UNITED STATES PATENT AND TRADEMARK OFFICE
CERTIFICATE OF CORRECTION

PATENT NO. : 5,860,035
DATED : January 12, 1999
INVENTOR(S) : K. Sato

It is certified that error appears in the above-identified patent and that said Letters Patent is hereby corrected as shown below:

Column 18, line 9 (claim 3, line 3) after "plurality" insert --of--.

Column 18, line 11 (claim 4, line 2) after "plurality" insert --of--.

Signed and Sealed this

Eighth Day of February, 2000

Attest:

Attesting Officer

Q. TODD DICKINSON

Commissioner of Patents and Trademarks